United States Patent [19]

Thiel et al.

[11] Patent Number: 4,537,291
[45] Date of Patent: Aug. 27, 1985

[54] BRAKE SHOE ASSEMBLY INCLUDING BRAKE SHOE SPRING

[75] Inventors: Rudolf Thiel, Frankfurt am Main; Helmut Weisbrod, Bad Nauheim; Hermann Braehler, Darmstadt, all of Fed. Rep. of Germany

[73] Assignee: ITT Industries, Inc., New York, N.Y.

[21] Appl. No.: 492,929

[22] Filed: May 9, 1983

[30] Foreign Application Priority Data

Jun. 2, 1982 [DE] Fed. Rep. of Germany ....... 3220632

[51] Int. Cl.³ .............................................. F16D 65/02
[52] U.S. Cl. ............................... 188/73.38; 188/250 E; 188/1.11
[58] Field of Search .............. 188/73.38, 73.37, 250 E, 188/73.1–73.2, 73.32, 73.36, 250 B, 250 A, 250 G, 205 A, 1.11, 234, 236; 267/155–156

[56] References Cited

U.S. PATENT DOCUMENTS

| 4,289,217 | 9/1981 | Heibel | 188/73.38 |
| 4,290,508 | 9/1981 | Baum | 188/73.38 |

FOREIGN PATENT DOCUMENTS

| 2751673 | 5/1978 | Fed. Rep. of Germany ... | 188/73.38 |
| 2937149 | 3/1980 | Fed. Rep. of Germany . | |
| 2090928 | 7/1982 | United Kingdom ............ | 188/73.38 |

Primary Examiner—Douglas C. Butler
Attorney, Agent, or Firm—James B. Raden

[57] ABSTRACT

A brake shoe assembly is composed of a carrier plate, a friction material lining secured to the carrier plate and the brake-shoe spring. The brake-shoe spring comprises between its legs a loop-shaped portion which is supported in a recess in the brake shoe, this recess being open towards the edge of the brake shoe. Arranged at the open recess is a projection which extends into the loop-shaped portion between two convolutions of the brake-shoe spring. The two convolutions are interconnected by a wire portion disposed at the area of the legs.

17 Claims, 10 Drawing Figures

BRAKE SHOE ASSEMBLY INCLUDING BRAKE SHOE SPRING

BACKGROUND OF THE INVENTION

The present invention relates to an assembly of a brake shoe with an associated brake shoe spring.

There are already known brake shoe assemblies in which the brake shoe includes a carrier plate and a lining of friction material secured to the carrier plate, and in which the brake-shoe spring has two legs that merge with and are interconnected by a loop-shaped portion which is received in a recess of the carrier plate and is secured in the recess normal to the plane of the carrier plate.

Furthermore, a brake shoe assembly is known from the German published patent application No. 29 37 149, wherein the brake shoe spring is constructed as a wire spring and its loop-shaped portion is retained in the recess of the carrier plate against movement radially and simultaneously in the circumferential direction of the brake shoe. While there is also a limited axial securing in position of the brake-shoe spring in the direction normal to the opening of the recess prior to the mounting of the brake-shoe spring on a brake caliper, due to the frictional engagement between the brake-shoe spring and the carrier plate since the loop-shaped portion is clamped in the recess of the carrier plate with radial preload, this frictional engagement is discontinued after the mounting of the brake shoe assembly on a brake caliper owing to the decrease in the outer diameter of the loop-shaped portion resulting from the loading of the brake-shoe spring. The clearance between the brake-shoe spring and the recess which results from this diameter reduction is conducive to slipping of the spring out of the recess. This situation is further aggravated by the effect of vibrations on the brake during the operation of the vehicle equipped with such a brake in that such vibrations can actually cause the loop-shaped portion of the spring to slip out of the recess. However, other forces acting on the brake, the brake shoes or the spring, may have the same effect. Of course, this is very disadvantageous since the disassociation of the spring from the brake shoe may result in a loss of the spring and will certainly impair the operation of the brake, if not render the same inoperative.

SUMMARY OF THE INVENTION

Accordingly, it is a general object of the present invention to avoid the disadvantages of the prior art.

More particularly, it is object of the present invention to provide a brake-shoe assembly of the type here under consideration which does not possess the disadvantages of the conventional assemblies of this type.

It is still another object of the present invention so to construct the brake-shoe assembly of the above type so as to assure the integrity of the assembly, that is, the retention of the brake-shoe spring on the brake shoe, while simultaneously achieving an easy assembling operation.

A concomitant object of the present invention is so to design the brake shoe and the associated spring as to be simple to manufacture, easy to use, relatively inexpensive, and reliable in operation nevertheless.

In pursuance of these objects and others which will become apparent hereafter, one feature of the present invention resides in a brake shoe assembly for use in its mounted position as a component of a brake, this assembly comprising a brake shoe including a carrier plate extending along a plane and having two oppositely acing major surfaces along this plane, an edge surface facing outwardly in the mounted position, delimiting surfaces that bound in the carrier plate at the area of the edge surface a recess that opens onto the edge surface, and a projection which extends into the recess substantially parallel to the aforementioned plane, and a friction material lining arranged at one of the major surfaces of the carrier plate and affixed to the carrier plate; and a spring, especially a wire spring, including a convoluted portion at least partially received in the recess of the carrier plate and having at least two convolutions situated across the projection from one another to confine the projection between themselves, and an interconnecting section connecting the convolutions with one another and situated at the region of the edge surface, and two legs each connected to one of the convolutions and extending therefrom outside the recess and outwardly of the edge surface as considered in the mounted position.

A particular advantage of this construction is that the loop-shaped wire spring can be easily assembled in the recess of the carrier plate. After the mounting of the brake shoe assembly on a brake, the wire spring will be safely retained on the carrier plate. The two convolutions embracing the projection not only provide the brake-shoe spring with a reliable seat on the carrier plate, but also bring about a smooth spring characteristic. This renders it possible to achieve particularly large spring travels without causing damage to the brake-shoe spring.

It is particularly advantageous to have the recess extend with its largest width up to the edge surface of the carrier plate. This makes it possible to slip on the brake-shoe spring radially from the outside onto the carrier plate in a particularly simple manner. It will be achieved by the fact that the projection is formed by a web which lies in the median plane of the carrier plate and subdivides the recess that the brake-shoe spring is held on the carrier plate in a particularly simple fashion.

In a preferred embodiment of the present invention, the recess is confined by lateral surfaces which extend on each side of the web substantially in parallel to one another. Advantageously, lateral surfaces meet the edge surface of the carrier plate on one side of the web at a different angle than the lateral surfaces on the other side of the web do. This provides for the brake-shoe spring to be stationarily supported on the carrier plate by simple means so that it is inhibited from slipping out of the recess in the carrier plate even prior to the mounting of the brake shoe assembly on the brake. The brake-shoe spring holding arrangement at the carrier plate can be manufactured by particularly simple means. To achieve this, for instance, the recess is punched out to a size that is smaller as compared to the finished size while punching out the carrier plate, and subsequently the final contour of the recess is formed by means of two shaping tools finishing the recess to its final size. After this, the recess is calibrated.

To the end that the two convolutions be slightly spread apart after the assembly of the brake-shoe spring with the carrier plate, the thickness of the carrier plate tapers towards its outer edge surface at the area of that of the lateral surfaces which forms an acute angle with the edge surface of the carrier plate. Shortly before the brake-shoe spring has assumed its final assembled position, it snaps into the recess and is rigidly connected to the carrier plate.

It is an advantage that the two planes of the coils extend substantially in parallel to each other and are in resilient abutment on the end faces of the web. It will be attained thereby that the coils bear equally against the end faces of the projection and that the brake-shoe spring is provided with a stable guidance as a result. Since the brake-shoe spring has a symmetrical design in relation to its center line that is parallel to the carrier plate, there will be furthermore ensured an even distribution of load at the brake-shoe spring and at the carrier plate.

To keep the risk of the interconnecting section breaking at its transitions to be two convolutions as small as possible, the interconnecting section extends at an angle smaller than 90° in relation to the planes of the convolutions. When this angle amounts to about 30°, the radii resulting at the transitions will be sufficiently large so that there is obtained a brake-shoe spring of great fatigue resistance.

In accordance with another advantageous facet of the present invention, the wire portion or interconnecting section extending between the two convolutions is formed by an additional convolution which is disposed in a support recess in the web. This additional convolution, whose diameter is smaller than that of the two circular convolutions, makes it possible to change the spring characteristic of the brake-shoe spring even more. It is expedient for the additional smaller diameter convolution to abut the radially inner edge of the recess of the projection. The smaller diamerter convolution thus serves as another guidance of the brake-shoe spring on the carrier plate both in a radial direction and in a circumferential direction of the carrier plate. In this arrangement, there may even be provided a clearance between the lateral surfaces of the recess and the larger diameter convolutions so that the effective lever length of the spring legs will be increased.

To ensure reliable coupling of the brake-shoe spring to the carrier plate in a radial direction, there is designed a retaining element extending normal to the longitudinal direction of the recess at the radially inner area at the end face of the projection. Particular ease of manufacture of the retaining element will be accomplished in that an indentation is impressed into the end face of the projection. However, it is also possible to give the retaining element the shape of a sheet-metal lug that is bent out of the projection to stand out therefrom. The retaining element is preferably so designed as to enable the brake-shoe spring to be fitted easily by hand. In doing so, the retaining element will elastically spread the two convolutions apart until the respective convolution snaps in behind the retaining element.

In another advantageous construction according to this invention, a central opening is disposed at the projection which extends concentrically relative to the openings of the convolutions and which serves to receive a pad-wear warning indicator. The pad-wear warning indicator is thus held stationary in the openings.

To prevent the spring travel of the brake-shoe spring from exceeding the admissible nominal value, it is advantageous to have spring arms designed at the leg ends, which spring arms are directed to the edge surface of the carrier plate and form a stop for the brake-shoe spring in the mounted position of the brake shoe on a brake caliper.

To prevent the wire portion or interconnecting section penetrating the recess at the web from abutting the inner edge of the end faces, it is expedient that, in the area of the wire portion, the end faces extend in parallel to the wire portion.

BRIEF DESCRIPTION OF THE DRAWING

Above-mentioned and other features and objects of this invention will become more apparent by reference to the following description taken in conjunction with the accompanying drawing, in which.

DETAILED DESCRIPTION OF THE PREFERRED EMBODIMENTS

Figure 1:
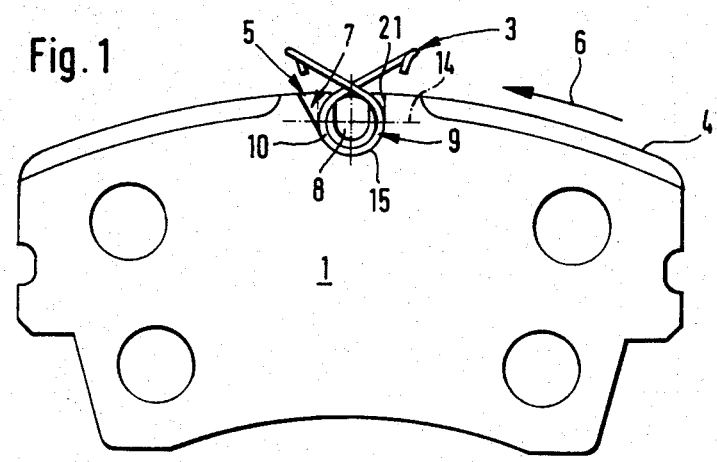
FIG. 1 is a front elevational view of the brake shoe assembly of the present invention, showing the major surface of the carrier plate to which no friction material is secured.
Figure 2:
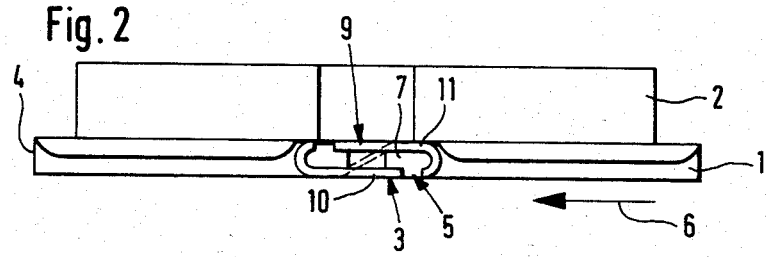
FIG. 2 is a top plan view of the brake shoe assembly FIG. 1.

Referring now to the drawing in detail, and first to FIGS. 1 and 2, it may be seen that they show a brake shoe assembly which comprises a carrier plate 1, a lining 2 of friction material secured to the carrier plate 1, and a brake-shoe spring 3.

As shown in FIGS. 1 through 4 and 8, the brake-shoe spring 3 is supported in a recess 5 in the carrier plate 1. The recess 5 opens onto an edge surface 4 of the carrier plate 1. A projection 7 extends into the open recess 5 along the plane of the carrier plate 1 which includes a circumferential direction 6 of the brake shoe assembly as considered in the position assumed by the latter relative to the brake. The projection 7 bounds an opening 8 extending substantially concentrically relative to the open recess 5. The brake-shoe spring 3 comprises a loop-shaped portion 9 which is composed of two circular convolutions 10 and 11 extending in parallel to one another. The convolutions 10 and 11 embrace the projection 7 at the respective two sides of the carrier plate 1 and abut respective end faces 12 and 13 of the projection 7.

As illustrated in FIGS. 1 through 4, the respective radially outer edges of the convolutions 10 and 11, which are situated below a center line 14, abut on the two respective sides of the projection 7 on respective facing lateral surfaces 15 and 16 that bound the open recess 5. This provides for the brake-shoe spring 3 to be held stationary on the carrier plate 1 in the radially downward direction as considered in the drawing, and also in the circumferential direction 6. The projection 7 provides for positive engagement of the brake-shoe spring 3 with the carrier plate 1 in direction normal to the plane of the carrier plate 1. This is accomplished by the penetration of the projection 7 between the two convolutions 10 and 11. At the major surface of the carrier plate 1 to which no friction material is affixed, there are provided, adjacent a portion of the lateral surface 15 which has an annular segment configuration, lateral surfaces 17 and 18 which extend substantially tangentially of the convolution 10 and which are inclined at an acute angle to the center line 14 while extending substantially parallel to one another. At the other major surface of the carrier plate 1 to which the friction material lining 2 is affixed (compare FIGS. 2 and 5), there are arranged, adjacent a circular portion of the lateral surface 16, lateral surfaces 19 and 20 which extend tangentially of the convolution 11 and at a right angle relative to the center line 14 radially outwardly, while extending substantially parallel to each other.

Figure 3:
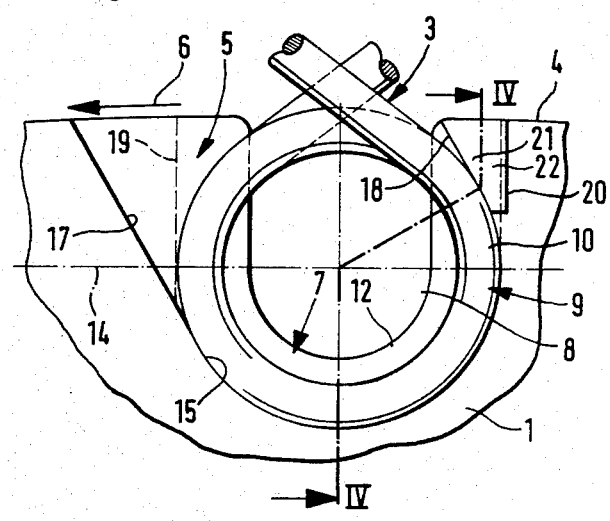
FIG. 3 is a view corresponding to that of FIG. 1 but showing a detail of the area to which the brake-shoe spring is mounted on the carrier plate, at a larger scale.
Figure 4:
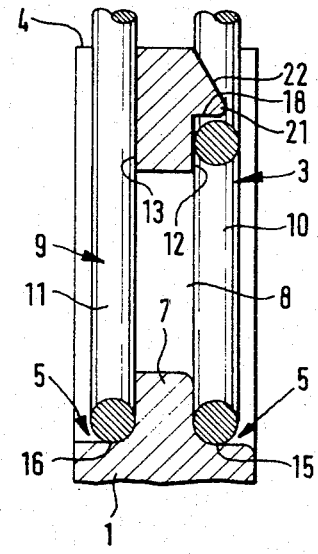
FIG. 4 is a cross-sectional view taken along the line IV—IV of FIG. 3.
Figure 5:
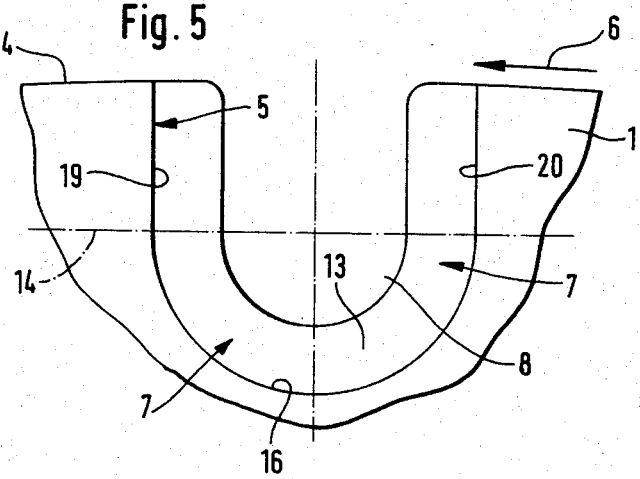
FIG. 5 is a rear elevational view of the carrier plate depicted in FIG. 3, showing a part of the other major surface of the carrier plate which faces the friction material.

The lateral surface 18 which is inclined towards the center line 14 radially inwardly delimits a stop 21, as particularly shown in FIGS. 1, 3 and 4 of the drawing. Since the brake-shoe spring 3 is prevented from displacement to the left as considered in FIG. 3 by the presence of the end face 19, the stop 21 constitutes the securing-in-position of the brake shoe spring 3 in the radially outward direction. An end face 22 of the stop 21 tapers or converges towards the outer edge surfaces of the carrier plate 1. This ensures an easier mounting of the brake-shoe spring 3 on the carrier plate 1 in that the surface 22 will spread the convolutions 10 and 11 apart during the mounting. On the other hand, the stop 21 will retain the convolution 10, and thus the spring 3, in the mounted position due to its engagement behind the convolution 10.

Figure 6:
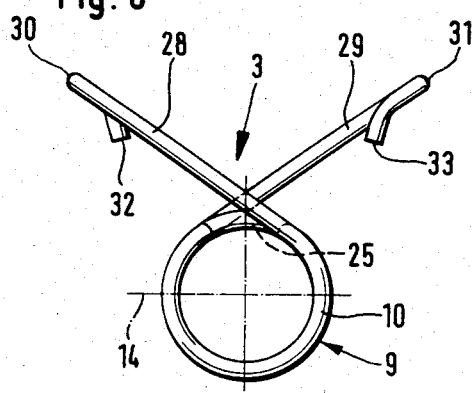
FIG. 6 is a front elevational view of the brake-shoe spring shown in FIG. 1 at the scale of FIG. 3.
Figure 7:
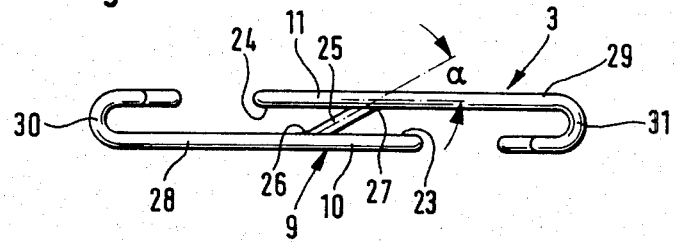
FIG. 7 is a top plan view of the brake-shoe spring of FIG. 6.

FIGS. 6 and 7 of the drawing show the brake-shoe spring 3 as an individual component. In this situation respective planes 23 and 24 of the two convolutions 10 and 11 extend substantially parallel to one another. Wire portion 25 interconnecting the two convolutions 10 and 11 extends at an acute angle relative to the two planes 23 and 24 of the convolutions 10 and 11. At the transitions between the convolutions 10 and 11 and the interconnecting wire portion 25, radii 26 and 27 are formed at the brake-shoe spring 3, having only such a magnitude that the planes 23 and 24 of the convolutions 10 and 11 approach respective spring legs 28 and 29 as close as possible and thus provide for a maximum possible guide surface at the brake-shoe spring 3. Each respective spring leg 28 and 29 extends tangentially of and parallel with the associated convolution 10 or 11, merging into the upper portion of the respective convolutions 10 and 11 as considered in FIG. 6. The ends of the respective spring legs 28 and 29 have U-shaped end portions directed toward the respective convolutions 10 and 11. The end portions 28 and 29 have respective upper surfaces 30 and 31 serving as abutments on a non-illustrated brake caliper, and respective lower free ends 32 and 33 that are adapted to abut the edge surface of the carrier plate 1, in the mounted position of the brake shoe assembly.

Figure 8:
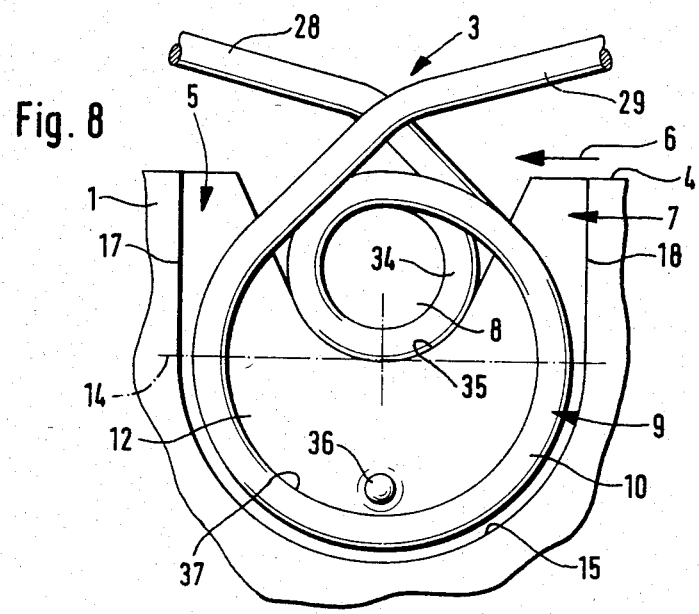
FIG. 8 is a view corresponding to that of FIG. 3 but showing a modified structure.
Figure 9:
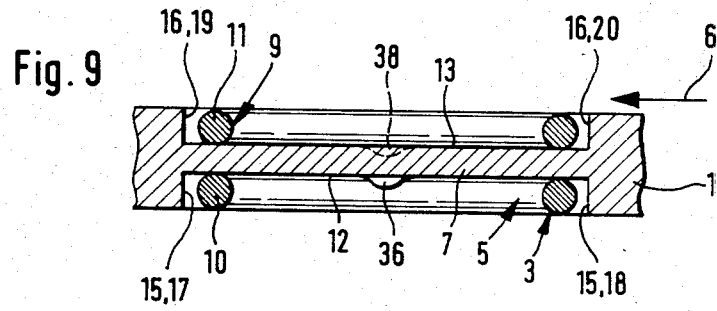
FIG. 9 is a cross-sectional view taken across the recess of FIG. 8.
Figure 10:
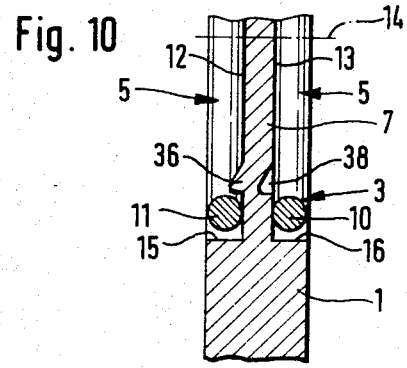
FIG. 10 is a partial sectional view taken along the recess at the area of a radial fastening arrangement for the brake-shoe spring of FIG. 8.

FIGS. 8, 9 and 10 of the drawing illustrate a modified construction of the brake shoe assembly. In this arrangement, the above-mentioned wire portion 25, as shown in FIG. 7, is replaced by an additional convolution 34 which is received in an additional recess 35 of the web or projection 7 and serves as a point of support or fulcrum for the brake-shoe spring 3. The recess 35 is open towards the edge surface 4 of the carrier plate 1. A clearance is provided between the respective lateral surfaces 15 and 16 of the open recess 5 and the associated convolutions 10 and 11, to the end that only the forces acting on the brake-shoe spring 3 be transmitted by the additional convolution 34 to the surfaces bounding the recess 35. This enables the brake-shoe spring 3 to operate like a balance beam or two-arm lever as it is being acted upon by forces of various magnitudes, the difference in magnitude being causes, for example, by the tolerance-dependent manufacture of the individual brake components and, thus, to transmit the resultant force evenly to the single point of support at the carrier plate 1. In this design, the lateral surfaces 15, 17 and 18 and the associated surfaces 16, 19 and 20 are respectively disposed in substantial registry with one another. The recess 5 is open radially upwardly, that is, substantially normal to the edge surface 4 and extends with its largest width, as considered in the plane of the carrier plate 1, up to the edge surface 4 of the carrier plate 1. A projection 55 is formed at the end face 12 of the web 7. The projection 36 extends transversely to the major surface of the carrier plate 1 and is engaged from behind by a surface 37 of the convolution 10. The peak of the projection 36 is tilted toward the convolution 10 so that the brake-shoe spring 3 is radially outwardly secured on the carrier plate 1. The projection 36 is advantageously formed by providing a dent or indentation 38 in the web 7 opposite to the intended location of the projection 36, so that the material displaced during the punching operation forms the projection 36. The recess 8 may also be used for accommodating at least a part of an arrangement for indicating the extent of wear of the friction mechanical lining 2. Such an arrangement may be of any conventional construction and hence has been omitted from the drawing.

While we have described above the principles of our invention in connection with specific apparatus, it is to be clearly understood that this description is made only by way of example and not as a limitation to the scope of our invention as set forth in the objects thereof and in the accompanying claims.

We claim:

1. A brake shoe assembly for use in its mounted position as a component of a brake, comprising
    a brake shoe including
        a carrier plate extending along a plane and having two oppositely facing major surfaces along said plane, an edge surface facing outwardly in the mounted position, delimiting surfaces that bound in said carrier plate at the area of said edge surface a recess that opens onto said edge surface, and a projection which extends into said recess substantially parallel to said plane, and
        a friction material lining arranged at one of said major surfaces and affixed to said carrier plate; and
    a spring including
        a convoluted portion at least partially received in said recess of said carrier plate and having at least two convolutions situated across said projection from one another to confine said projection between themselves, and an interconnecting section connecting said convolutions with one another and situated at the region of said edge surface, and two legs each connected to one of said convolutions and extending therefrom outside said recess and outwardly of said edge surface as considered in the mounted position.

2. The brake shoe assembly as defined in claim 1, wherein said spring is a wire spring.

3. The brake shoe assembly as defined in claim 1, wherein said recess has a portion of a maximum width as considered along said plane that extends all the way to said edge surface.

4. The brake shoe assembly as defined in claim 1, wherein said projection is formed by a web extending along said plane and subdividing said recess into two sections, each of said convolutions being received in a different one of said recess sections.

5. The brake shoe assembly as defined in claim 4, wherein said delimiting surfaces include first delimiting surfaces bounding one, and second delimiting surfaces bounding the other of said recess sections, each of said first and second delimiting surfaces including two lateral surface portions facing each other and extending substantially parallel to one another toward said edge surface.

6. The brake shoe assembly as defined in claim 5, wherein said lateral surface portions of said first delimiting surfaces meet said edge portion at an angle different from that at which said lateral surface portions of said second delimiting surface meet said edge surface.

7. The brake shoe assembly as defined in claim 6, wherein at least one of said lateral surface portions meets said edge surface at an acute angle; and wherein the thickness of said web as considered normal to said plane diminishes toward said edge surface at least as the region of said one lateral surface portion.

8. The brake shoe assembly as defined in claim 4, wherein said convolutions extend substantially parallel to one another at least when confining said web between themselves.

9. The brake shoe assembly as defined in claim 8, wherein said web has two end faces extending substantially along said plane and facing away from one another, and wherein said convolutions respectively resiliently engage said end faces.

10. The brake shoe assembly as defined in claim 8, wherein said interconnecting section extends at an acute angle relative to the planes of said convolutions.

11. The brake shoe assembly as defined in claim 4, wherein said web has a supporting recess therein; and wherein said interconnecting section includes an additional convolution situated between said two convolutions and received in said supporting recess.

12. The brake shoe assembly as defined in claim 11, wherein said web has a support surface bounding said support recess; and wherein said additional convolution has a diameter smaller than that of said convolutions and is in contact with said support surface.

13. The brake shoe assembly as defined in claim 1, and further comprising at least one retaining section rigid with an extending from said projection substantially normal to said plane at a region of said projection which is remote from said end surface.

14. The brake shoe assembly as defined in claim 13, wherein said projection has two end faces facing oppositely to one another and is formed at one of said end faces with an indentation situated at said remote region, the material of said projection that is displaced from said indentation forming said retaining section at the other of said end faces.

15. The brake shoe assembly as defined in claim 1, and further comprising means for bounding a central opening at said projection extending substantially normal to said plane and operative for receiving a lining-wear warning indicator.

16. The brake shoe assembly as defined in claim 1, wherein said legs of said spring have respective spring arms at the regions thereof remote from said convolution portion, said spring arms being directed toward said edge surface of said carrier plate to constitute abutments for the latter in the mounted position.

17. The brake shoe assembly as defined in claim 1, wherein said projection has two end faces, each facing one of said two convolutions and extending substantially parallel to said interconnecting section at the region of the latter.

* * * * *